(12) United States Patent
Zheng et al.

(10) Patent No.: US 7,858,137 B2
(45) Date of Patent: *Dec. 28, 2010

(54) STABILIZATION OF FRESH MOZZARELLA CHEESE USING FERMENTED WHEY

(75) Inventors: Zuoxing Zheng, Palatine, IL (US); David Mehnert, Lake Villa, IL (US); Susan Monckton, Carol Stream, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 229 days.

This patent is subject to a terminal disclaimer.

(21) Appl. No.: 11/958,684

(22) Filed: Dec. 18, 2007

(65) Prior Publication Data

US 2008/0095886 A1    Apr. 24, 2008

Related U.S. Application Data

(62) Division of application No. 10/877,422, filed on Jun. 25, 2004, now Pat. No. 7,323,204.

(51) Int. Cl.
*A23C 19/00* (2006.01)

(52) U.S. Cl. .......................... 426/582; 426/34; 426/36; 426/41; 426/532; 426/654

(58) Field of Classification Search ............... 426/34, 426/36, 38, 39, 40, 41, 42, 43, 52, 531, 532, 426/580, 582, 654
See application file for complete search history.

(56) References Cited

U.S. PATENT DOCUMENTS 7,323,204 B2 * 1/2008 Zheng et al. ................ 426/582

* cited by examiner

*Primary Examiner*—Leslie Wong
(74) *Attorney, Agent, or Firm*—Fitch, Even, Tabin & Flannery

(57) ABSTRACT

The invention is directed to a fermented and clarified nisin-containing whey and a method of making that can be used to produce a stabilized food product by adding, for example, to the pack water of fresh mozzarella cheese. The resulting stabilized food product retards or limits below detection levels the growth of toxins from pathogenic bacterial contaminants when the nisin-containing whey is added in amounts between about 10 to about 30% to the food product. The stabilized food product improves the safety of the food by retarding the growth of *Listeria monocytogenes* and improves the shelf life of the product by retarding the growth of gas forming bacteria such as bacteria from the *Leuconostoc* species.

6 Claims, 2 Drawing Sheets

STABILIZATION OF FRESH MOZZARELLA CHEESE USING FERMENTED WHEY

This application is a divisional of U.S. application Ser. No. 10/877,422, now U.S. Pat. No. 7,323,204.

FIELD OF THE INVENTION

The invention is directed to a food product that is stabilized against the growth of microbiological contaminants. More specifically, the present invention is directed to a fresh mozzarella cheese that is stabilized against the growth of microbiological contaminants by using a nisin-containing whey. The invention is also directed to a method of producing a nisin-containing whey and, more specifically, to a method of producing a nisin-containing whey from acid whey. The invention is also directed to a nisin-containing whey, and more particularly, to a nisin-containing whey that is suitable for use in pack water of fresh mozzarella cheese.

BACKGROUND OF THE INVENTION

Mozzarella cheese is one of the more popular cheeses, especially for use in Italian cooking. There are generally two types of mozzarella cheese: a low-moisture mozzarella and a high-moisture mozzarella. Low moisture mozzarella, which typically has a moisture content of less than 50%, has a long shelf life and is suitable for lengthy distribution supply chains and subsequent store display. High-moisture mozzarella, such as a fresh mozzarella cheese, on the other hand, typically has a moisture content of greater than 50%. The higher moisture gives the cheese a softer and more desirable taste and texture. To maintain this desired taste and texture, fresh mozzarella cheese is often packed in water to maintain its freshness.

Unfortunately, high-moisture, water-packed fresh mozzarella cheeses are more perishable and have shorter shelf lives. The higher moisture content of the cheese and the added pack water renders the product more susceptible to microbiological growth. Fresh mozzarella cheese also naturally has a pH of about 5.8, which may further cause problems with extended freshness. In combination, the relatively high pH and high moisture content poses a risk of growth of pathogenic bacteria such as *Listeria monocytogenes* if contaminated with such bacteria. In addition, the typical shelf life of commercial fresh mozzarella cheese is generally only about four weeks due to gas formation by gas-producing spoilage bacteria such as bacteria from the *Leuconostoc* species in the event of contamination.

Whey is a diary processing byproduct from the manufacture of cheese. It is the serum or watery part of milk that is separated from the curd during the cheese-making process. Whey is often characterized by the type of cheese produced. For example, sweet whey is a whey generated from the manufacture of cheddar, mozzarella, or Swiss cheeses. On the other hand, acid whey is a whey generated from the manufacture of ricotta, impastata, cottage, or cream cheeses. Acid whey typically contains mainly lactose and low levels of denatured and highly cross-linked whey proteins. It has very limited commercial value due to difficulties in recovering such solid substances. Processing acid whey by traditional methods such as spray drying for protein and lactose recoveries is quite difficult and cost prohibitive. More often, a manufacturer simply disposes of the acid whey byproduct, and generally pays a disposal fee to get rid of it.

Nisin is a peptide-like antibacterial substance produced by microorganisms such as *Lactococcus lactis* subsp. *lactis* (formerly known as *Streptococcus lactis*). It has been used to help stabilize various food products and its structure is illustrated in U.S. Pat. No. 5,527,505 to Yamauchi et al. The highest activity preparations of nisin contain about 40 million International Units (IU) per gram. Commercial preparations of nisin are available. For example, one commercial preparation, NISAPLIN®, containing about 1 million IU, nisin per gram, is available from Aplin & Barrett Ltd., Trowbridge, England. Another commercial preparation, CHRISIN®, also containing about 1 million IU, nisin per gram, is available from Chr. Hanson A/S (Denmark). Nisin has no known toxic effects in humans. It is widely used in a variety of prepared dairy foods. Experimental use in preserving other foods has also been reported. Details on these applications are provided below.

In U.S. Pat. No. 5,527,505, yogurt was produced from raw milk by incorporating a nisin-producing strain, *Lactococcus lactis* subsp. *lactis*, along with the traditional yogurt culture consisting of *Streptococcus salivarius* subsp. *thermophilus* (ST) and *Lactobacillus delbrueckii* subsp. *bulgaricus* (LB). This patent teaches that the lactococci are needed to secrete the nisin, whose effect is to retard the activity of ST and LB. The resulting yogurt therefore contains the lactococci used to produce the nisin.

In U.S. Pat. No. 5,015,487, the use of nisin, as a representative of the class of lanthionine bacteriocins, to control undesirable microorganisms in heat processed meats is disclosed. In tests involving dipping frankfurters in nisin solutions, the growth of *L. monocytogenes* was effectively inhibited upon storage at 40° F.

Chung et al. (Appl. Envir. Microbiol., 55, 1329-1333 (1989)) report that nisin has an inhibitory effect on gram-positive bacteria, such as *L. monocytogenes, Staphylococcus aureus,* and *Streptococcus lactis,* but has no such effect on gram-negative bacteria such as *Serratia marcescens, Salmonella typhimurium,* and *Pseudomonas aeruginosa.*

Nisin or a nisin-producing bacterial culture has been added to cheeses to inhibit toxin production by *Clostridium botulinum* (U.S. Pat. No. 4,584,199). Nisaplin® has been found to preserve salad dressings from microbiological contamination for extended shelf life periods (Muriana et al., J. Food Protection, 58:1109-1113 (1995) (challenge studies using *Lactobacillus brevis* subsp. *lindnen*)).

More recently, whey from nisin-producing cultures has been used to preserve and stabilize food compositions, including fermented dairy products, mayonnaise-type spreads, cream cheese products, meat compositions, meat/vegetable compositions, and cooked pasta. These uses of whey from nisin-producing cultures are described in U.S. Pat. Nos. 6,136,351 ("Stabilization of Fermented Dairy Compositions Using Whey from Nisin-Producing Cultures"); 6,113,954 ("Stabilization of Mayonnaise Spreads Using Whey from Nisin-Producing Cultures"); 6,110,509 ("Stabilization of Cream Cheese Compositions Using Nisin-Producing Cultures"); 6,242,017 ("Stabilization of Cooked Meat Compositions Stabilized by Nisin-Containing Whey and Methods of Making"); and 6,613,364 ("Stabilization of Cooked Meat and Vegetable Compositions Using Whey From Nisin-Producing Cultures and Product Thereof"); and U.S. patent application Ser. No. 09/779,756 now U.S. Pat. No. 6,797,308 ("Stabilization of Cooked Pasta Compositions Using Whey From Nisin-Producing Cultures"). These applications, which are owned by the same assignee as the present invention, are incorporated herein by reference in their entireties.

Methods of producing the nisin-containing whey have also been documented. For example, a method of producing nisin-containing whey from skim milk is disclosed in U.S. Pat. Nos. 5,716,811; 6,242,017; 6,110,509; 6,136,351; and 6,113,954.

Furthermore, another method to produce a similar nisin-containing whey from sweet whey is disclosed in U.S. Pat. No. 6,613,364 and U.S. patent application Ser. No. 09/779,756 now U.S. Pat. No. 6,797,308.

Unfortunately, a shortcoming of the existing nisin-containing whey compositions and accompanying methods for their production is that the inhibitor is unsuitable for use in fresh mozzarella cheese and the accompanying pack water. The poor clarity of existing nisin-containing whey compositions manufactured using known methods is unacceptable for addition to the clear pack water of fresh mozzarella cheese because it renders the product undesirable to consumers. Moreover, the resulting acidity of nisin-containing whey compositions made from known methods actually shortens the shelf-life of fresh mozzarella cheese by affecting the texture and integrity of the cheese.

Accordingly, there remains a need to provide a stabilized, fresh mozzarella cheese and a need to provide a method of producing an antimicrobial ingredient that is suitable for use in the pack water of fresh mozzarella cheese. In particular, there remains a need to improve the safety of fresh mozzarella cheese by retarding the growth of pathogenic bacteria or limiting their growth below detection levels and there also remains a need to increase the usable shelf life of a fresh mozzarella cheese in pack water by retarding or limiting below detection levels gas-forming bacteria. There also remains a need to provide a stabilized fresh mozzarella cheese using natural and innocuous ingredients. Furthermore, there also remains a need to provide a value added use to the acid whey byproduct from cheese manufacture.

SUMMARY OF THE INVENTION

The invention is directed to a fermented, nisin-containing whey, especially a fermented and clarified nisin-containing whey, and methods of making such nisin-containing whey. The resulting clarified nisin-containing whey can be used to produce stabilized food products, such as, for example, fresh mozzarella cheese. The use of such nisin-containing whey (generally at a level of about 10 to about 30%) in the pack water of fresh mozzarella cheese stabilizes the fresh mozzarella cheese and improves its safety by retarding the growth of undesirable microorganisms (e.g., *Listeria monocytogenes*, gas forming bacteria such as *leuconostoc* species, and the like) or reducing their growth to below detection levels.

In a preferred form, the stabilized food product comprises fresh mozzarella cheese and pack water, where the pack water comprises a clarified nisin-containing whey. The pack water should generally have a nisin-equivalent activity of at least 360 IU/ml and preferably at least 460 IU/ml. The stabilized food product comprises between about 10 to about 40% of the nisin-containing whey (preferably 20 to about 30%).

The invention is also directed to a method of making a clarified nisin-containing whey comprising (a) preparing an aqueous composition comprising at least one whey source selected from the group consisting of acid whey, whey protein concentrate, and protein hydrolysate; (b) fermenting the aqueous composition with a nisin-producing culture until the pH attains about 5.2 to about 5.8 (preferably about 5.5); (c) maintaining the pH of the fermenting composition at about 5.2 to about 5.8 (preferably about 5.5) for about 8 to about 12 hours (preferably about 10 hours); (d) allowing the pH of the fermenting composition to drop to about 4.8 to 5.2 (preferably about 5.0) to form a fermented composition containing nisin having a nisin equivalent activity; (e) adding an acid to the fermented composition to drop the pH to about 3.5 to about 5.0 (preferably about 4.0) to form an acidified composition; (f) filtering the acidified composition to form a filtered composition; (g) adding a base to the filtered composition to raise the pH to about 5.5 to about 6.0 (preferably about 5.8) to form the clarified nisin-containing whey, wherein the clarified nisin-containing whey has a nisin-equivalent activity of about 800 to about 2,0000 IU/ml (preferably about 1500 IU/ml). Generally, the length of step (b) is about 4 to about 8 hours (preferably 6 hours) and the length of step (d) is about 2 to about 6 hours (preferably about 4 hours).

The invention is also directed to a clarified nisin-containing whey that includes an acid whey, whey protein concentrate, a protein hydrolysate, and a naturally produced nisin-like peptide. The clarified nisin-containing whey has a pH of about 5.5 to about 6.0 (preferably 5.8) and a nisin-equivalent activity of at least about 800 IU/ml, preferably about 800 to about 2000 IU/mg, and more preferably about 1500 IU/mg. Preferably, the clarified nisin-containing whey reduces the risk of the growth of *Listeria monocytogenes* or *leuconostoc* species or reduces the growth below detection limits.

In another form, the clarified nisin-containing whey has an activity of at least about 1500 IU/ml. Preferably, the clarified nisin-containing whey has a clarity sufficient to be added to pack water of fresh mozzarella cheese without significantly altering the texture of the cheese as compared to a fresh mozzarella cheese without the nisin-containing whey.

DETAILED DESCRIPTION

The invention relates to a stabilized food product, preferably a fresh mozzarella cheese, with enhanced safety and shelf life through the addition of a clear liquid antimicrobial ingredient. The invention also relates to a method of producing a clear liquid antimicrobial ingredient from whey. The invention is further directed to a clear liquid antimicrobial ingredient that is suitable for addition to pack water of fresh mozzarella cheese.

In general, the liquid antimicrobial ingredient is preferably a clarified nisin-containing whey or nisin-containing whey composition, which is a liquid having a clarity suitable for addition to pack water of fresh mozzarella cheese. The clarified nisin containing whey is suitable for use with fresh mozzarella cheese because it does not significantly affect the texture or integrity of the resulting fresh mozzarella cheese product and does not affect the clarity of the cheese's pack water. By incorporating the clarified nisin-containing whey into the pack water of fresh mozzarella cheese at levels of about 10 to about 40% (preferably about 20 to about 30%), the stabilized fresh mozzarella cheese is obtained where the growth of pathogens such as *Listeria monocytogenes* and gas-formers such as *Leuconostoc* species are significantly retarded or reduced below detection levels.

Figure 1:
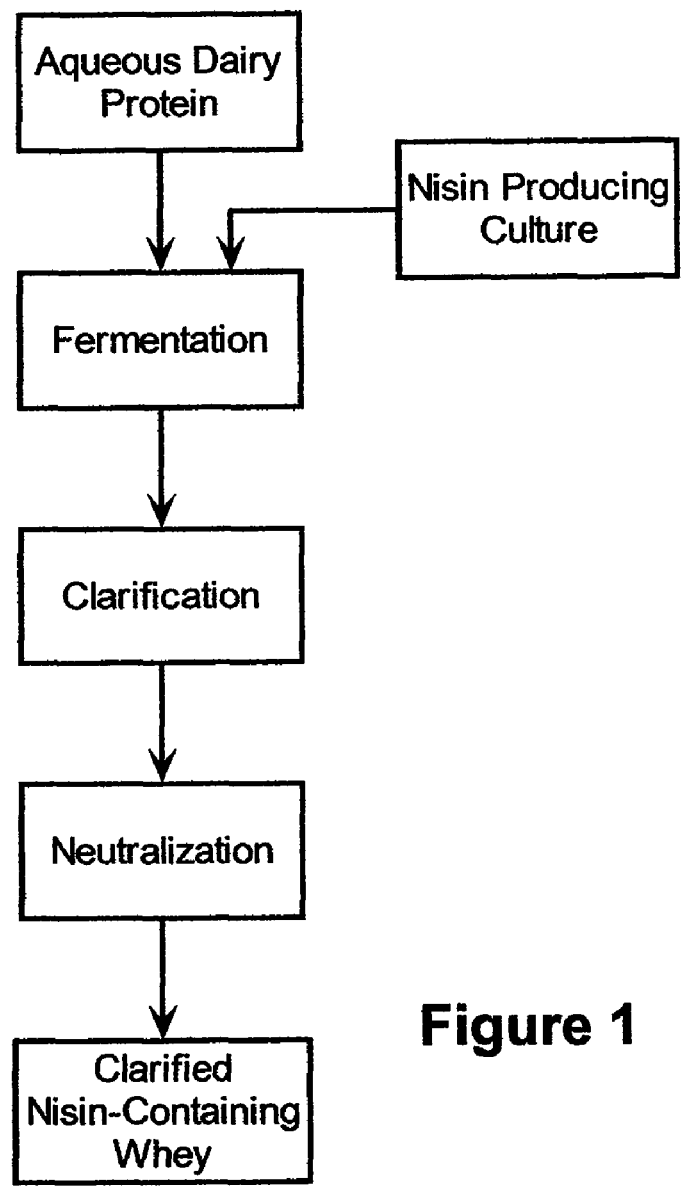
FIG. 1 provides a flow chart illustrating an exemplary method for the production of a clarified nisin-containing whey.

In general, the preferred method to produce the clarified nisin-containing whey suitable for use with fresh mozzarella cheese comprises the fermenting of a whey, preferably acid whey, with a nisin-producing culture followed by acidification, filtration, and neutralization of the fermented composition as shown in FIG. 1. The resulting product of the method in FIG. 1 has strong antimicrobial activity against certain gram-positive pathogenic and spoilage bacteria such as *List-*

*eria monocytogenes* and *Leuconostoc* species and is suitable for use in the pack water of high moisture cheeses.

For purposes of this invention, the terms "nisin-containing whey" and "nisin-containing cultured whey," which can be used interchangeably, are intended to include the whey product derived from a nisin-producing culture. Generally, such a nisin-containing cultured whey is obtained by any of a variety of equivalent procedures involving fermentation by a nisin-producing microorganism in an acceptable medium (e.g., whey, corn syrup, sugar solution, and the like). In one such procedure, the nisin-containing cultured whey is obtained from the fermentation of a fortified cheese whey composition using nisin-producing microorganisms. In this procedure, after the pH in the fermentation has fallen to about 5.5, the pH is maintained at this value for about 8 to about 10 hrs before allowing the pH to drop further. In an alternative procedure, a pasteurized dairy product such as milk is first inoculated with the nisin-producing microorganism. Following curd formation, the nisin-containing whey is separated from the curd using any conventional technique, including, for example, centrifugation, filtration, and the like. This method effectively removes most or essentially all of the microorganisms in the nisin-containing cultured whey. The nisin-containing cultured whey may be employed in the products and methods of this invention.

Cultures capable of producing nisin-containing cultured whey have the potential of secreting many fermentation products into the fermentation medium. Thus, in addition to nisin and lactate, there may be further components present in nisin-containing whey produced in the fermentation process. Some of the components may contribute to the beneficial properties of the preservable preparations of the invention, and to the beneficial effects of the methods of the invention. Without wishing to limit the scope of this invention, therefore, the terms "nisin-containing whey" and "nisin-containing cultured whey" encompass all components contained therein, both those currently known and those which may remain uncharacterized at the present time, that contribute to the beneficial attributes of the present invention.

As used herein, "nisin-containing whey" and "nisin-containing cultured whey" also relates to the whey described above that has subsequently been reduced in volume to a more concentrated liquid, or that has been completely dried, by evaporation, lyophilization, or comparable procedures. The terms relate additionally to such a concentrated or dried whey that is subsequently reconstituted, either partially or completely, by the addition of water or a water-containing composition.

As used herein, the term "stabilized preparation" as applied to a food product, such as, fresh mozzarella cheese in pack water, relates to a preparation which has been treated so that the growth of pathogenic microorganisms that may contaminate the preparation are retarded or reduced below detection levels, or in which the production of toxins by such microorganisms is retarded or reduced below detection levels.

The stabilization of fresh mozzarella cheese against the hazardous proliferation of pathogenic microorganisms results from the use of the clear, liquid antimicrobial composition added to the pack water of fresh mozzarella cheese. The clear, liquid antimicrobial composition is preferably a clarified nisin-containing cultured whey produced from acid whey.

Figure 2:
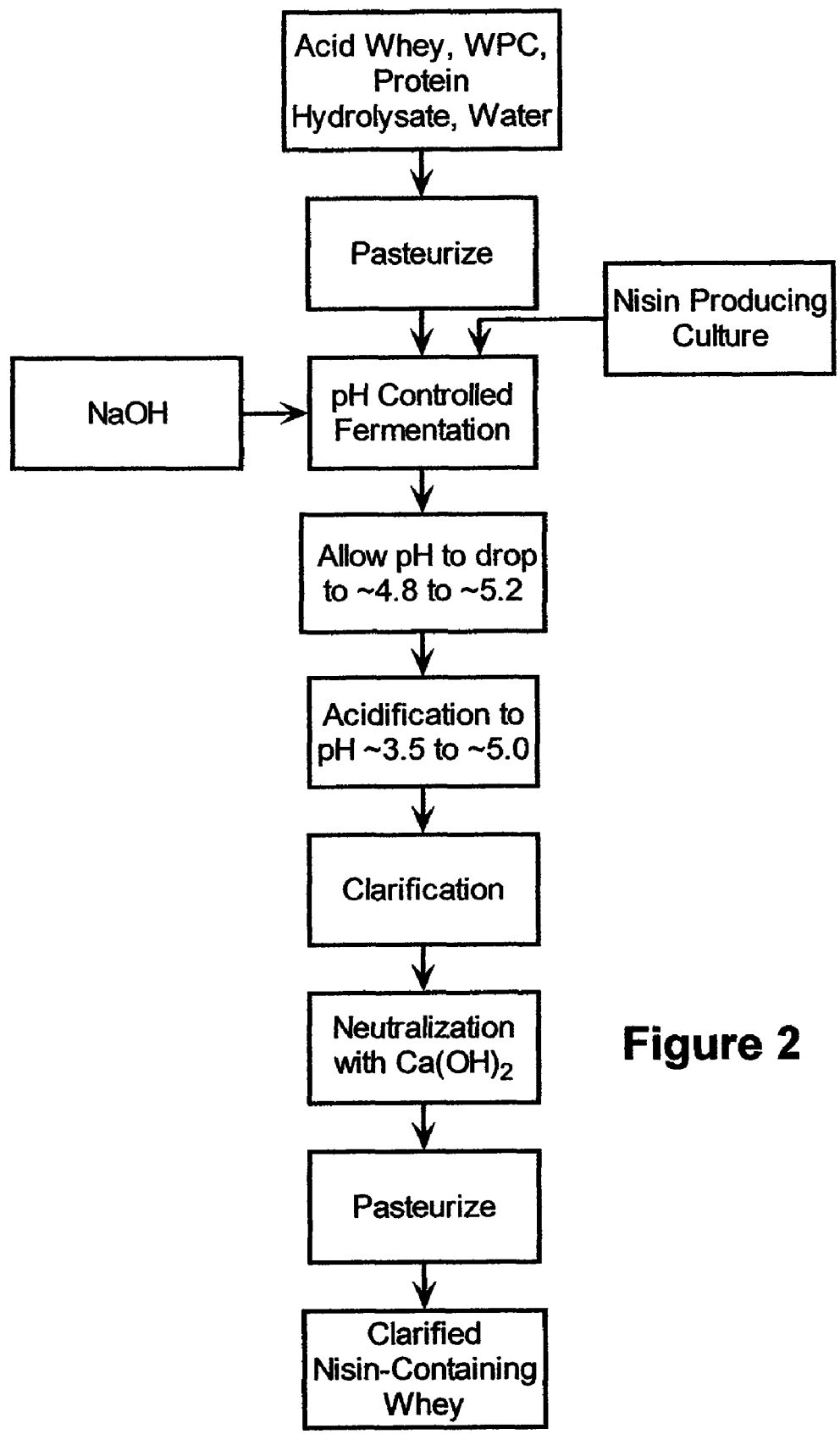
FIG. 2 provides an example of a preferred method to produce a clarified nisin-containing whey.

More specifically, the clarified nisin-containing whey is produced by a preferred method as generally illustrated through the sequential steps shown in FIG. 2. This preferred method comprises (a) preparing an aqueous composition comprising at least one whey source selected from the group consisting of acid whey, whey protein concentrate, and protein hydrolysate; (b) fermenting the aqueous composition with a nisin-producing culture until the pH attains about 5.2 to about 5.8 (preferably about 5.5); (c) maintaining the pH of the fermenting composition at about 5.2 to about 5.8 (preferably about 5.5) for about 8 to about 12 hours (preferably about 10 hours); (d) allowing the pH of the fermenting composition to drop to about 4.8 to 5.2 (preferably about 5.0) to form a fermented composition containing nisin having a nisin equivalent activity; (e) adding an acid to the fermented composition to drop the pH to about 3.5 to about 5.0 (preferably about 4.0) to form an acidified composition; (f) filtering the acidified composition to form a filtered composition; (g) adding a base to the filtered composition to raise the pH to about 5.5 to about 6.0 (preferably about 5.8) to form the clarified nisin-containing whey, wherein the clarified nisin-containing whey has a nisin-equivalent activity of about 800 to about 2,0000 IU/ml (preferably about 1500 IU/ml). Generally, the length of step (b) is about 4 to about 8 hours (preferably 6 hours) and the length of step (d) is about 2 to about 6 hours (preferably about 4 hours).

A base fermentation medium may be an aqueous composition of at least about 30% acid whey. The acid whey used for the method can be obtained, for example, from the fermentation of a ricotta cheese, impastata cheese, cream cheese, or cottage cheese. The typical ricotta acid whey contains a high level of lactose as a carbon source but low levels of a nitrogen source; as a result, acid whey is not an ideal composition for the production of nisin-containing whey. Consequently, to increase the yield of antimicrobial metabolites including nisin-like bacteriocin produced by the nisin-producing culture, the fermentation medium preferably includes supplements and/or increased acid whey concentrations. For example, preferred supplements include at least about 0.05 to about 2% whey protein concentrate (WPC) (most preferably about 1%) and/or about 0.05 to about 0.05% (most preferably about 0.1%) protein hydrolysate such as N,Z-amine™. Optional supplements include a yeast extract, such as concentrations of about 0.1 to about 0.5% (preferably about 0.25%). In addition, fermentation mediums may include up to about 70% acid whey. A preferred supplemented fermentation medium is a blended aqueous composition comprising about 50 to about 70% ricotta whey, about 0.5 to about 1% WPC, and about 0.1 to about 0.5% protein hydrolysate.

Prior to fermentation, the aqueous medium may optionally be pasteurized. Typical pasteurization conditions include heating the medium at about 85° C. for about 45 minutes and then cooling the medium to about 30° C.

For fermentation, the composition is inoculated with about $1 \times 10^5$ to about $1 \times 10^7$ cfu/ml (preferably about $2 \times 10^6$ cfu/ml) of a nisin-producing culture. An example of a nisin-producing microorganism is *Lactococcus lactis* subsp. *lactis*. The preferred fermenting method is to incubate at about 30° C. for about 16 hours at a pH of about 5.5, followed by a pH drop to about 5.0 for about 4 hours. The resultant fermented medium has about $1.2 \times 10^9$ cfu/ml of live bacteria cells, a pH of about 4.9-5.0, and a titratable acidity of about 0.42%. These preferred fermentation conditions combined with the preferred fermentation medium generally yields a fermented composition, prior to filtering or clarification, having a nisin equivalent activity of about 1600 IU/ml as determined by well assay using a nisin-sensitive strain of *Lactococcus lactis* subsp. *cremois*. As later described in the examples, other fermentation conditions and fermentation mediums will also produce acceptable results. Alternative fermentation mediums produce yields of at least 800 IU/ml.

The resulting product of the fermentation is a whey containing nisin; however, at this point, the whey is not yet suitable for use with fresh mozzarella. After fermentation, the product may be further processed as described below to render it useful with fresh mozzarella cheese, or it may be centrifuged in order to use the supernatant only, or it may be concentrated by evaporation of the whole fermented whey.

As suggested above, it is preferred that the fermented medium be processed further to render it suitable for use with fresh mozzarella. Unfortunately, the fermented composition generally has a pH of about 5.0, which as discussed more below, is typically not suitable for use with fresh mozzarella cheese and creates difficulty in subsequent processing steps. Moreover, the fermented composition contains high levels of solid suspensions and bacterial cells, which also are not acceptable to be added to the clear pack water of fresh mozzarella cheese.

To be useful with fresh mozzarella, the nisin-containing whey is first filtered or clarified to a clear liquid. As noted above, the composition has a pH of about 5.0, which presents difficulties in obtaining a clear preparation that retains good antimicrobial activity. Simple centrifugation can only remove a small portion of the suspended solids leaving the lower density solids still suspended in the liquid. Microfiltration may be an effective way to obtain a clear preparation, but a significant amount of the antimicrobial activity in the filtrate is lost during filtration. Even filtering with a membrane having a pore size of 0.65 µm, which is much larger than the size of individual nisin molecules, results in significant antimicrobial activity lost in the filtration. While not wishing to be limited to theory, a possible explanation is that the nisin molecules tend to interact with each other and/or with other proteins to form aggregates of multiple complexes at near neutral or higher pH, and such aggregates cannot easily pass through the microfiltration membrane, resulting in significant loss in nisin equivalent activity in the filtrate.

In order to clarify the composition and retain high antimicrobial activity, the composition is acidified before microfiltration to solubilize nisin molecule complexes allowing the nisin molecules to pass through the microfiltration membrane. This phenomenon was also observed by several independent researchers (Ray, "Nisin of *Lactococcus lactis* ssp. *lactis* as a food biopreservative," in Food Biopreservatives of Microbial Origin, edited by Bibek Ray and Mark Daeschel, CRC Press, 207-264 (1992); U.S. Pat. No. 5,232,849 to Vedamuthu et al.,). The solubility of nisin is highly pH-dependent. Hurst reported that the solubility of nisin is about 12% at pH 2.5 and this is reduced to only 4% at pH 5.0 and almost to zero at neutral and alkaline pH. Nisin has an isoelectric point in the alkaline side (Hurst, "Nisin," in Advances in Applied Microbiology, 27, 85-163, (1981)).

By acidifying prior to microfiltration, the antimicrobial activity is almost completely retained in the resultant clarified fermented whey. To obtain a clear preparation of the nisin-containing composition with high antimicrobial activity, the fermented whey is acidified with and edible acid (e.g., lactic acid, citric acid, hydrochloric acid, phosphoric acid, and mixtures thereof, or the like) to a pH of about 4 or below prior to microfiltration. It is preferred to acidify using lactic acid to a pH of about 4.0 and then to filter using a membrane with a pore size of about 0.65 µm.

In order to effectively add the filtered nisin-containing acid whey composition to the pack water of fresh mozzarella cheese, the composition still needs to be neutralized. Naturally, the pH of fresh mozzarella cheese is about 5.8. Unfortunately, adding the clarified nisin-containing whey directly after the microfiltration step (with a pH of about 4.0 or below) to the pack water of fresh mozzarella cheese, which has a pH of about 5.8, causes the cheese to fall apart during its usable shelf life. Therefore, the fermented nisin-containing whey is neutralized to a pH of about 5.5 to about 6.0 (preferably about 5.8) before being added to pack water of fresh mozzarella cheese.

On the other hand, the nisin-containing whey composition with a pH of about 4.0 is very stable and, if pasteurized, can be stored for several months at refrigeration temperatures without losing activity. Consequently, it is preferred to store the nisin-containing whey composition at a pH of about 4.0 and then neutralize the nisin-containing whey composition to a pH of about 5.8 just prior to addition to fresh mozzarella.

Choosing an appropriate neutralizer is also very important for fresh mozzarella applications. For example, if NaOH is used to neutralize the preparation, and the preparation added to fresh mozzarella cheese, the cheese falls apart even quicker than when the non-neutralized preparation is used. To be suitable in fresh mozzarella cheese, this nisin-containing composition preferably is neutralized to a pH of about 5.5 to about 6.0 (preferably about 5.8) with food grade calcium hydroxide. The fermented whey neutralized with calcium hydroxide does not significantly alter the texture of the cheese, and in fact, improves the stability of the product over an extended shelf life.

The above described method produces a clarified nisin-containing whey composition, which is suitable for use with fresh mozzarella cheese and comprises a naturally produced nisin-like peptide. The clarified nisin-containing whey composition is suitable for fresh mozzarella because it does not significantly affect the cheese texture or integrity and is a substantially clear liquid that generally does not impact the clarity of the pack water. Moreover, the clarified nisin-containing whey composition improves the safety of the cheese because it retards the growth of bacteria such as *Listeria monocytogenes* or reduces their growth below detectable levels and also increases shelf life because it similarly retards or reduces the growth below detection levels of the gas-forming bacteria such as bacteria from the *leuconostoc* species. The clarified nisin-containing whey composition produced from the method of the invention has at least a nisin-equivalent activity of about 800 IU/ml and preferably at least about 1500 IU/ml if the preferred fermentation medium and conditions are used.

When the clarified nisin-containing whey composition is added to the pack water of fresh mozzarella cheese, the stabilized fresh mozzarella cheese is obtained. Once added to the product, the stabilized fresh mozzarella having, for example, an initial nisin equivalent activity of about 460 IU/ml still has a nisin-equivalent activity of about 360 IU/ml after 50 to 55 days. To obtain the stabilized preparation, it is preferred to add the clarified nisin-containing whey composition to the pack water of the fresh mozzarella in amounts between about 10 and about 40%, and most preferably in amounts between about 20 and about 30%. The stabilized fresh mozzarella cheese retards or reduces below detection levels the growth of microorganisms such as *listeria monocytogenes* or *leuconostoc* specie and has a shelf life exceeding four weeks.

In addition, the antimicrobial activity of the clarified nisin containing whey in the pack water of fresh mozzarella cheese generally remains stable over the shelf life of the product. Thus, even after the product is opened by the consumer, but not consumed at once, the remaining pack water still has effective antimicrobial activity against potential recontamination of *Listeria monocytogenes* or spoilage organisms for a reasonable time period (generally about 7 to about 14 days under refrigerated conditions). Of further importance, the bioconversion process involves a natural fermentation of natural dairy materials with a food grade culture and when added to fresh mozzarella cheese, the product is still a natural dairy product.

It should also be noted that, although the above description was completed in the context of fresh mozzarella, the present invention would be useful in other high-moisture, high-pH cheeses as well. The clarified nisin-containing whey composition with high antimicrobial activity could also be used directly, or further concentrated or dried and used in other food or drink products for pathogen control and shelf life extension.

The following examples are intended to illustrate the invention and not to limit it. Unless otherwise indicated, all percentages are by weight. All references cited in the present specification are hereby incorporated by reference.

EXAMPLE 1

This example provides a process for producing a nisin-containing whey yielding a high level of nisin-equivalent activity. Acid whey from fermentation of ricotta cheese (composition shown in Table 1) was fortified with whey protein concentrate (WPC) and a protein hydrolysate (N-Z amine™ from Quest International, Rochester, Minn.). The components were blended with water to form the fermentation medium as shown in Table 2.

TABLE 1

Compositions of a Typical Acid Set Ricotta Whey.

| Composition | Content (%) |
|---|---|
| Lactose | 6.0 |
| Fat | 0.2 |
| Total protein | 0.5 |
| α-lactalbumin | 0.1 |
| β-lactoglobulin | 0.1 |
| Cross-linking | 77 |
| Non protein nitrogen | 0.06 |
| Calcium | 0.05 |
| Lactic acid | 0.04 |
| Ash | 0.9 |
| Total solids | 7.4 |
| pH | 5.8 |

TABLE 2

Fermentation medium formulation for the nisin-containing whey composition production.

| Component | Content (%) |
|---|---|
| Ricotta whey | 50 |
| WPC | 1 |
| Protein hydrolysate | 0.1 |
| Water | 48.9 |

The blended formulation of Table 2 was pasteurized, cooled, and inoculated with a culture containing about $2 \times 10^6$ cfu/ml of a nisin-producing culture. The fermentation was allowed to proceed for about 6 hours to a pH of about 5.5. The fermentation was then held at a pH of about 5.5 for about 10 hours, followed by a pH drop to about 5.0 over an additional about 4 hour period. The resultant medium had the characteristic shown in Table 3.

TABLE 3

Characteristics of fermented ricotta whey

| Measure | Value |
|---|---|
| pH | 5.0 |
| Titratable acidity | 0.42% |
| Culture count | $1.2 \times 10^9$ cfu/ml |
| Nisin equivalent activity | 1600 IU/ml |

The cell count and nisin equivalent activity in the medium during the fermentation process were monitored. While not wishing to be limited by theory, the bacteria appears to have a very short lag phase under the fermentation conditions, and rapidly reached the maximum growth in about 6 hours. However, the nisin activity was not detected until about 5 hours of fermentation. Again, not wishing to be limited by theory, it appears that the nisin-like antimicrobial metabolites were produced during the late log phase and maximized in the stationary phase.

EXAMPLE 2

This example illustrates the yield (i.e., nisin-equivalent activity) at different pH and compositions of the fermentation medium. The fermentation was carried out as illustrated in Example 1, but the pH and composition of the base medium and supplement were varied as shown in Table 4. The results of the experiment are also shown in Table 4, which provides the yield as a function of different mediums and pH. The data shows that the fermentation preferably should be carried out under a controlled pH (generally at about 5.5) because the effect of fermentation pH on the yield of antimicrobial activity can be significant.

TABLE 4

Effect of Media Composition and Fermentation pH on Antimicrobial Activity Yield.

| Base medium | Supplement | pH | Activity (IU/ml) |
|---|---|---|---|
| 100% Ricotta whey | 1% WPC, 0.1% N,Z-amine ™ | 5.5 | 1750 |
| 70% Ricotta whey | 1% WPC, 0.1% N,Z-amine ™ | 5.5 | 1702 |
| 50% Ricotta whey | 1% WPC, 0.1% N,Z-amine ™ | 5.5 | 1625 |
| 30% Ricotta whey | 1% WPC, 0.1% N,Z-amine ™ | 5.5 | 1433 |
| 50% Ricotta whey | 1% WPC, 0.1% N,Z-amine ™, 0.1% yeast extract | 5.5 | 1692 |
| 50% Ricotta whey | 1% WPC, 0.1% N,Z-amine ™, 0.25% yeast extract | 5.5 | 1729 |
| 50% Ricotta whey | 0.5% WPC, 0.1% N,Z-amine ™, 0.25% yeast extract | 5.5 | 1605 |
| 50% Ricotta whey | 0.5% WPC, 0.1% N,Z-amine ™, 0.5% yeast extract | 5.5 | 1640 |
| 50% Ricotta whey | 1% WPC, 0.1% N,Z-amine ™ | 5.0 | 1554 |
| 50% Ricotta whey | 1% WPC, 0.1% N,Z-amine ™ | 6.0 | 1200 |
| 50% Ricotta whey | 1% WPC, 0.1% N,Z-amine ™ | — | 810 |

EXAMPLE 3

This example illustrates the effect of pH on the yield during the microfiltration step. A fermented composition was prepared as illustrated in Example 1. The fermented composition contained high levels of solid suspensions and bacterial cells, and, thus, was not suitable to be added to the clear pack water of fresh mozzarella cheese. Different clarification methods, such as centrifugation and microfiltration, were tried. Microfiltration was most effective to remove cloudiness from the fermented whey.

The fermented whey was first filtered at a pH of about 5. At this pH, a significant amount of the antimicrobial activity was lost in the retentate as shown in Table 5. The material was filtered through a commercial microfiltration unit with a membrane pore size of 0.65 μm (CFP-6-D6A, A/G Technology Corporation). Nisin is a small peptide with a molecular weight of 3500 Dalton; therefore, it theoretically should easily pass through the microfiltration membrane. As a matter of fact, the microfiltration results shown in Table 5 contradict this assumption. While not wishing to be limited by theory, this contradiction suggests the nisin-like antimicrobial peptides in the fermented whey tend to interact with each other or with other protein molecules to form aggregates or multiple complexes at near neutral pH, and thus, cannot easily pass through the microfiltration membrane.

The fermented whey was next acidified in separate trials with lactic acid to a pH of about 4 and about 3.5. After filtration, the antimicrobial activity was recovered at high levels in the filtrate as shown in Table 5. The resulting clear filtrate retained the majority of the antimicrobial activity (i.e., about 95%). Preferably, the filtered composition retains at least about 95% of the activity of the original fermented composition.

TABLE 5

Effect of pH on microfiltration efficacy of fermented whey

| pH | Membrane | Original activity | Filtrate activity | Retentate activity |
|---|---|---|---|---|
| 5.0 | 0.1 μm | 1500 u/ml | 0 u/ml | 6800 u/ml |
| 5.0 | 0.65 μm | 1530 u/ml | 800 u/ml | 3420 u/ml |
| 4.0 | 0.65 μm | 1640 u/ml | 1550 u/ml | 1810 u/ml |
| 3.5 | 0.65 μm | 2030 u/ml | 1900 u/ml | 2110 u/ml |

EXAMPLE 4

This example illustrates the inhibition of *Listeria monocytogenes* by fermented whey in a liquid system. The nisin-containing whey composition fermented as in Example 1 and microfiltered at a pH of 4 as in Example 3 was added to BHI (brain heart infusion) broth medium at concentration levels of 0, 2.5, 5, 10, 15, 20, 25 and 30%. The BHI medium was then inoculated with 1% of activated *Listeria monocytogenes* 5-strain cocktail (about $1 \times 10^7$ cfu/ml) containing the following strains: (1) Center for Disease Control coleslaw isolate 861, (2) Jalisco F2399, (3) National Food Processors Association isolate 83, (4) plant environment isolate 328, and (5) plant environment isolate 225. The inoculated broth medium was then incubated at 35° C. and the growth of *L. monocytogenes* was monitored. Optical density (absorbance at 630 nm) of the broth was used to measure the growth of the bacteria. Table 6 shows the growth data of *L. monocytogenes* in BHI containing different levels of fermented whey.

TABLE 6

Growth of *Listeria monocytogens* in BHI broth with various concentrations of clarified nisin containing whey

| | Absorbance at 630 nm | | | | | | |
|---|---|---|---|---|---|---|---|
| Time (h) | 0 | 5 | 10 | 15 | 20 | 25 | 29 |
| 0% | 0.096 | 0.27 | 0.713 | 0.583 | 0.521 | 0.486 | 0.516 |
| 2.5% | 0.095 | 0.107 | 0.525 | 0.593 | 0.558 | 0.539 | 0.534 |
| 5% | 0.096 | 0.089 | 0.093 | 0.228 | 0.481 | 0.511 | 0.465 |
| 10% | 0.095 | 0.09 | 0.088 | 0.088 | 0.09 | 0.09 | 0.087 |
| 15% | 0.1 | 0.091 | 0.091 | 0.091 | 0.093 | 0.091 | 0.089 |
| 20% | 0.095 | 0.093 | 0.09 | 0.091 | 0.09 | 0.09 | 0.089 |
| 25% | 0.097 | 0.097 | 0.097 | 0.098 | 0.096 | 0.096 | 0.093 |
| 30% | 0.093 | 0.093 | 0.091 | 0.092 | 0.092 | 0.092 | 0.091 |

Clearly, the fermented whey had strong inhibitory effect on the growth of *Listeria monocytogenes* in the liquid medium. Lower levels of such nisin-containing whey compositions delayed the growth by extending its lag phase; 10% or higher levels of such nisin-containing whey compositions reduced the growth of *L. monocytogenes* in BHI broth medium to undetectable levels as shown in Table 6.

EXAMPLE 5

This example illustrates the inhibition of a spoilage organism which generates gas by nisin-containing whey in a liquid system. Among spoilage organisms associated with fresh mozzarella cheese is the natural occurring gas-formers such as the *Leuconostoc* species. Such bacteria generate gas within a sealed container of the product during storage and cause a blistering appearance on the cheese. The gas accumulated in the pack water will eventually build pressure inside the plastic container and such pressure can cause visible deformation or damage to the package. By visual observation, a gassy product is easily rejected by consumers because it is viewed as spoiled. Therefore, the gas formation is often used as an indicator of spoilage of fresh mozzarella cheese, and it is a critical limiting factor determining the shelf life of the product.

A gas-producing bacteria isolate was obtained from commercial fresh mozzarella cheese product. It was identified as *Leuconostoc citreum*. This example illustrates the inhibitory effect of the fermented nisin containing whey made in Example 1 and microfiltered at a pH of 4 as in Example 3 against the gas forming isolate in a liquid system. MRS broth containing various levels of the fermented whey made in Example 1 was inoculated with 1% of the activated gas-forming isolate (about $1.0 \times 10^7$ cfu/ml). The mixture was then incubated at 30° C. for 30 hours and the absorbance of the broth at 630 nm was monitored as an indicator of bacterial growth. Table 7 shows data from the growth curves of the gas-former isolate in MRS broth containing different levels of fermented whey. The fermented whey, even at low levels, inhibited the gas-forming isolate.

TABLE 7

Inhibition of *Leuconostoc citreum* by Fermented Whey at Various Concentrations in MRS Broth.

| Time | Absorbance at Various Levels of Nisin-Containing Whey | | | | | | | |
|---|---|---|---|---|---|---|---|---|
| (hours) | 0 | 2.5% | 5% | 10% | 15% | 20% | 25% | 30% |
| 0 | 0.264 | 0.256 | 0.266 | 0.249 | 0.249 | 0.249 | 0.226 | 0.223 |
| 5 | 0.292 | 0.247 | 0.263 | 0.248 | 0.248 | 0.251 | 0.229 | 0.226 |
| 10 | 0.611 | 0.245 | 0.261 | 0.247 | 0.249 | 0.253 | 0.232 | 0.228 |
| 15 | 0.671 | 0.246 | 0.261 | 0.248 | 0.252 | 0.255 | 0.234 | 0.233 |

TABLE 7-continued

Inhibition of *Leuconostoc citreum* by Fermented Whey at Various Concentrations in MRS Broth.

| Time | Absorbance at Various Levels of Nisin-Containing Whey | | | | | | | |
|---|---|---|---|---|---|---|---|---|
| (hours) | 0 | 2.5% | 5% | 10% | 15% | 20% | 25% | 30% |
| 20 | 0.663 | 0.242 | 0.260 | 0.246 | 0.252 | 0.254 | 0.235 | 0.234 |
| 25 | 0.674 | 0.238 | 0.260 | 0.247 | 0.254 | 0.255 | 0.237 | 0.237 |

EXAMPLE 6

This example illustrates the inhibition of *Listeria monocytogenes* by fermented whey in fresh mozzarella cheese. The fermented nisin containing whey prepared in Example 1 and microfiltered at pH 4 as in Example 3 was added to pack water of fresh mozzarella cheese at concentrations of 0, 5, 10, 15, 20, and 25%. The pack water was inoculated with the 5-strain *Listeria monocytogenes* cocktail of Example 4 at about $5 \times 10^3$ cfu/ml. All packaged products were stored at 4° C. for extended periods. The survival of *Listeria monocytogenes* in each package was monitored during the storage period. The results are shown in Table 8.

TABLE 8

Fate of *L. monocytogenes* in fresh mozzarella pack water containing various levels of nisin-containing whey composition.

| Storage time | Survival (cfu/ml) at Varying Concentrations of Added Fermented Whey | | | | | |
|---|---|---|---|---|---|---|
| (days) | 0% | 5% | 10% | 15% | 20% | 25% |
| 0 | 5600 | 610 | 630 | 440 | 210 | 270 |
| 2 | 4100 | 330 | 280 | 220 | 130 | 120 |
| 7 | 1600 | 95 | 27 | 22 | 29 | 19 |
| 21 | 1500 | 81 | 11 | 20 | 11 | 12 |
| 28 | 1300 | 74 | 17 | 13 | 4 | 6 |
| 35 | 1300 | 72 | 20 | 7 | 8 | 2 |
| 42 | 2000 | 96 | 8 | 29 | 2 | 1 |
| 49 | 6500 | 440 | 28 | 7 | 1 | <1* |

*Below detection levels.

The data shows that the fermented whey was effective in retarding the growth of *Listeria monocytogenes* in the pack water of fresh mozzarella cheese product. Addition of such clarified nisin-containing whey in the pack water at 20% or higher resulted in complete (i.e., below detection levels) or near complete elimination of *Listeria monocytogenes* from the initial inoculation level of 5600 cfu/ml in 7 weeks. In contrast, *Listeria* levels in the control sample (0% nisin containing whey) initially decreased somewhat but then actually increased over time.

EXAMPLE 7

This example illustrates the effect of fermented whey on the texture of fresh mozzarella cheese. A fermented nisin containing whey composition was prepared as in Example 1. The composition was then microfiltered at a pH of about 4 to produce a clear microfiltered preparation as described in Example 3. The microfiltered preparation at pH 4 (control), a preparation neutralized with NaOH to pH 5.8 (NaOH adjusted), and a preparation neutralized with Ca(OH)$_2$ to pH 5.8 (Ca(OH)$_2$ adjusted) were added to the pack water of fresh mozzarella cheese balls at a level of 25%. All samples were packaged in sealed containers and stored at 4° C. for 8 weeks. The clarity of the pack water was measured periodically at an absorbance at 650 nm as shown in Table 9. The higher integrity demonstrated by the cheese balls during storage, the higher the clarity (and lower absorbance value) of the pack water observed.

TABLE 9

Clarity of Pack Water of Fresh Mozzarella Cheese as Affected by the Addition of Fermented Whey Preparations.

| Storage time | Absorbance at 650 nm | | |
|---|---|---|---|
| (days) | Control | NaOH adjusted | Ca(OH)$_2$ adjusted |
| 1 | 0.1466 | 0.0687 | 0.1145 |
| 2 | 0.1902 | 0.4425 | 0.0527 |
| 5 | 0.2772 | 1.3881 | 0.2136 |
| 7 | 0.4078 | 1.7616 | 0.3919 |
| 14 | 0.7333 | 2.063 | 0.4716 |
| 21 | 0.6889 | 1.9998 | 0.5125 |
| 28 | 0.6682 | 2.0044 | 0.5841 |
| 35 | 0.7359 | 2.0398 | 0.5008 |
| 42 | 0.823 | 1.9866 | 0.5375 |
| 49 | 0.9557 | 2.0985 | 0.59 |
| 56 | 0.9817 | 2.1325 | 0.5778 |

The product with the pack water containing the nisin-containing whey composition neutralized with NaOH to a pH of about 5.8 was very detrimental to the texture of the fresh Mozzarella cheese. In the NaOH adjusted samples, the cheese balls fell apart within a few days, resulting in a rapid increase in turbidity of the pack water. The product with pack water containing the nisin-containing whey composition neutralized with Ca(OH)$_2$ to a pH of about 5.8 maintained the integrity of the cheese balls over the extended shelf life. In fact, the clarity of the pack water was better with the Ca(OH)$_2$ adjusted samples than the clarity of the pack water in the untreated control. Consequently, it is preferred that the clarified nisin-containing whey be fermented as in Example 1, microfiltered at a pH of about 4 as in Example 3, and neutralized with calcium hydroxide to a pH of about 5.8 as in this example.

EXAMPLE 8

This example shows the stability of the clarified nisin-containing whey composition in the pack water of fresh mozzarella cheese. The clarified nisin-containing whey was prepared as described in Example 7. The clarified fermented whey was added to the pack water of fresh mozzarella cheese at a level of 25%. At time zero, the pack water exhibited a nisin equivalent activity of about 460 IU/ml, which appears to be high enough to effectively retard both pathogens such as *Listeria monocytogenes* and spoilage organisms such as gas producing *Leuconostoc* species. After 8 weeks of storage, which is twice the current shelf life for conventional fresh mozzarella cheese, the pack water still contained about 360 IU/ml of nisin equivalent activity (Table 10), which still appears to be effective in retarding pathogenic and spoilage organisms in the product. The components in the cheese and the pack water did not appear to substantially affect the antimicrobial activity of the nisin-containing whey composition. The overall antimicrobial activity of the fermented whey in the pack water remained stable over a prolonged storage of the product.

Unlike process treatments such as heat pasteurization, the antimicrobial activity of the nisin-containing whey composition prepared in Example 1 appears to remain substantially stable in the product over the shelf life and appears to continuously serve as a barrier to both pathogenic and spoilage organisms. The data in Table 10 shows that the nisin level in the pack water containing 25% of the clarified nisin-containing whey composition remained substantially stable over 8 weeks at 4° C.

measured automatically every hour as the optical density at 630 nm in a Microplate Autoreader. The inhibition results are shown in Table 11 where the concentration of both the clarified nisin-containing whey and Nisaplin® are expressed as standard nisin units equivalent per ml.

TABLE 11

Growth of *Listeria monocytogens* by BHI broth at 35° C. with Nasaplin ® and the clarified nisin containing whey.

| | Absorbance at 650 nm Incubation time (h) | | | | | | | | | | | |
|---|---|---|---|---|---|---|---|---|---|---|---|---|
| | 0 | 5 | 10 | 15 | 20 | 25 | 26 | 30 | 35 | 40 | 45 | 48 |
| Control | 0.099 | 0.143 | 0.618 | 0.609 | 0.595 | 0.586 | 0.586 | 0.572 | 0.558 | 0.536 | 0.502 | 0.489 |
| 100 IU/ml Nisaplin | 0.098 | 0.102 | 0.315 | 0.556 | 0.525 | 0.437 | 0.428 | 0.389 | 0.329 | 0.284 | 0.29 | 0.294 |
| 200 IU/ml Nisaplin | 0.094 | 0.096 | 0.158 | 0.486 | 0.539 | 0.465 | 0.454 | 0.406 | 0.372 | 0.307 | 0.283 | 0.292 |
| 500 IU/ml Nisaplin | 0.1 | 0.097 | 0.098 | 0.098 | 0.131 | 0.407 | 0.458 | 0.562 | 0.536 | 0.496 | 0.462 | 0.451 |
| 100 IU/ml inhibitor | 0.094 | 0.098 | 0.147 | 0.333 | 0.421 | 0.435 | 0.423 | 0.427 | 0.408 | 0.396 | 0.381 | 0.378 |
| 200 IU/ml inhibitor | 0.093 | 0.095 | 0.098 | 0.104 | 0.111 | 0.116 | 0.115 | 0.117 | 0.115 | 0.108 | 0.109 | 0.109 |
| 500 IU/ml inhibitor | 0.09 | 0.096 | 0.096 | 0.094 | 0.095 | 0.098 | 0.098 | 0.099 | 0.1 | 0.1 | 0.099 | 0.101 |

TABLE 10

Stability of nisin-containing whey in pack water

| Storage time | Nisin-equivalent activity (IU/ml) |
|---|---|
| 1 | 460 |
| 2 | 469 |
| 5 | 489 |
| 7 | 462 |
| 14 | 459 |
| 28 | 396 |
| 35 | 388 |
| 42 | 369 |
| 49 | 385 |
| 56 | 360 |

EXAMPLE 9

This example illustrates the retardation of nisin-resistant *Listeria monocytogenes* by the clarified nisin-containing composition. Fermented whey contains naturally produced nisin-like peptide and other antimicrobial compounds such as organic acids and hydrogen peroxide. This complex system may exhibit stronger antimicrobial activities than purified individual components. To confirm and better understand the synergism of this system, the antimicrobial efficacies of the clarified nisin-containing whey as described in Example 7 were compared with a commercial, purified nisin preparation available under the tradename Nisaplin®, which is available from Danisco A/S (Denmark). Nisaplin® is a natural antimicrobial composition typically comprising 2.5% nisin, 77.5% sodium chloride, 12% protein, 6% Carbohydrate, and 2% moisture with a nisin activity of about $1 \times 10^6$ IU/g.

A mixture of 5 strains of *Listeria monocytogenes* as described in Example 4 was inoculated with BHI broth containing varying concentrations (i.e., 100, 200, and 500 IU/ml nisin equivalent activity) of the clarified nisin-containing whey composition and Nisaplin®. The samples were incubated at 35° C. for 48 hours. The microbial growth was The clarified nisin-containing whey composition showed significantly stronger anti-listerial activity than Nisaplin®. The clarified nisin-containing whey composition as described in Example 7 at 200 IU/ml level was able to completely inhibit (i.e., below detection levels) the growth of *Listeria monocytogenes*, while Nisaplin® extended the lag phase but did not significantly inhibit the growth even at the level of 500 IU/ml.

What is claimed is:

1. A stabilized food product comprising fresh mozzarella cheese, pack water, and an effective amount of a clarified nisin-containing whey, wherein the pack water and the clarified nisin-containing whey provide a liquid medium for the fresh mozzarella cheese.

2. The stabilized food product of claim 1, wherein the clarified nisin-containing whey provides a nisin-equivalent activity of at least 360 IU/ml in the liquid medium.

3. The stabilized food product of claim 2, wherein the nisin-equivalent activity in the liquid medium is at least 360 IU/ml after 8 weeks of storage.

4. The stabilized food product of claim 1, wherein the clarified nisin-containing whey provides a nisin-equivalent activity of at least 460 IU/ml in the liquid medium.

5. The stabilized food product of claim 1, wherein the stabilized food product contains about 10 to about 40% of the clarified nisin-containing whey.

6. The stabilized food product of claim 1, wherein the amount of clarified nisin-containing whey is effective to retard or reduce below detection levels the growth of microorganisms selected from the group consisting of *Listeria monocytogenes* and a *Leuconostoc* specie.

* * * * *